US009474138B2

(12) United States Patent
Denteneer et al.

(10) Patent No.: US 9,474,138 B2
(45) Date of Patent: Oct. 18, 2016

(54) FAILURE DETECTION IN LIGHTING SYSTEM

(71) Applicant: KONINKLIJKE PHILIPS N.V., Eindhoven (NL)

(72) Inventors: Theodorus Jacobus Johannes Denteneer, Eindhoven (NL); Oscar Garcia Morchon, Aachen (DE); Ashish Vijay Pandharipande, Eindhoven (NL); David Ricardo Caicedo Fernández, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/394,480

(22) PCT Filed: Apr. 12, 2013

(86) PCT No.: PCT/IB2013/052914
§ 371 (c)(1),
(2) Date: Oct. 15, 2014

(87) PCT Pub. No.: WO2013/160791
PCT Pub. Date: Oct. 31, 2013

(65) Prior Publication Data
US 2015/0069920 A1  Mar. 12, 2015

Related U.S. Application Data

(60) Provisional application No. 61/637,910, filed on Apr. 25, 2012.

(51) Int. Cl.
*H05B 37/02*       (2006.01)
*H05B 37/03*       (2006.01)
*H05B 33/08*       (2006.01)
*G01J 1/42*        (2006.01)
*G01M 11/00*       (2006.01)

(52) U.S. Cl.
CPC ............ *H05B 37/03* (2013.01); *G01J 1/4257* (2013.01); *G01M 11/00* (2013.01); *H05B 33/089* (2013.01); *H05B 33/0851* (2013.01); *H05B 37/0218* (2013.01)

(58) Field of Classification Search
CPC .............. H05B 37/0227; H05B 37/02; H05B 37/0272; H05B 33/0851; H05B 37/0218; H05B 37/0254; H05B 37/03; H05B 39/042; H05B 33/089; Y02B 20/46; Y02B 20/48; G01J 1/4257; G01M 11/00
See application file for complete search history.

(56) References Cited

U.S. PATENT DOCUMENTS 8,427,076 B2 * 4/2013 Bourquin et al. ............ 315/307
8,810,137 B2 * 8/2014 Dahlen et al. ................ 315/152
(Continued)

FOREIGN PATENT DOCUMENTS

| JP | 2006142853 A | 6/2006 |
| WO | 2009060369 A2 | 5/2009 |
| WO | 2011033444 A1 | 3/2011 |

OTHER PUBLICATIONS

Li, Weihua, "Structured Residual Vector-Based Approach to Sensor Fault Detection and Isolation," Department of Chemical and Material Engineering, University of Alberta, Edmonton, Journal of Process Control, 12 (2002) (15 pages).

*Primary Examiner* — Vibol Tan
(74) *Attorney, Agent, or Firm* — Meenakshy Chakravorty (57) ABSTRACT

The present invention relates to a method of detecting a failed luminaire and/or light sensor in a lighting system comprising M luminaires and N light sensors. The elements $D_{sl}$ of an N×M transfer matrix D expresses how each luminaire l affect a light sensor s with respect to sensed light intensity, wherein s=1, 2, . . . N, and l=1, 2, . . . , M. The method comprises the steps of: setting the intensity of light emitted by the respective luminaires in the lighting system to a first intensity setting according to the respective elements of a first intensity vector $I^{(1)}$ (102), determining a first sensor intensity vector $E^{(1)}$ (104), setting the intensity of light emitted by the respective luminaires to at least a second intensity setting according to the respective elements of a second intensity vector $I^{(2)}$ (106), wherein at least one element of $I^{(2)}$ differs from a corresponding element or elements in determining a second sensor intensity vector $E^{(2)}$ (108), determining fault detection vectors from a difference between $E^{(1)}$ and $D \cdot I^{(1)}$) and between $E^{(2)}$ and $D \cdot I^{(2)}$, respectively (110), and identifying a failed luminaire and/or light sensor on basis of a difference between corresponding elements of the respective fault detection vectors (112). The present invention further relates to a failure detection system for detecting a failed luminaire and/or light sensor.

16 Claims, 3 Drawing Sheets

(56) References Cited

U.S. PATENT DOCUMENTS

| | | | |
|---|---|---|---|
| 8,878,439 B2* | 11/2014 | Noguchi et al. | 315/152 |
| 2007/0272831 A1 | 11/2007 | Dailey et al. | |
| 2009/0152441 A1 | 6/2009 | Pak et al. | |
| 2012/0161636 A1* | 6/2012 | Khazi et al. | 315/121 |

* cited by examiner

LEGEND FOR FIGS. 4-5
200: FUNCTIONAL DIAGRAM
210: DEVICE FAILURE IDENTIFICATION
222: SENSOR INPUT
224: IDENTIFICATION OF FAILED DEVICE
232: TYPE OF FAILED DEVICE
250: CONTROLS
262: NOTICE
D: TRANSFER MATRIX
$D_S$: REDUCED TRANSFER MATRIX

FAILURE DETECTION IN LIGHTING SYSTEM

CROSS-REFERENCE TO PRIOR APPLICATIONS

This application is the U.S. National Phase application under 35 U.S.C. §371 of International Application No. PCT/IB13/052914, filed on Apr. 12, 2013, which claims the benefit of U.S. Provisional Patent Application No. 61/637,910, filed on Apr. 25, 2012. These applications are hereby incorporated by reference herein.

FIELD OF THE INVENTION

The present invention relates to a method of identifying a failed luminaire and/or a failed light sensor in a lighting system.

BACKGROUND OF THE INVENTION

Networked lighting systems consist of luminaires, light sensors, and motion sensors, interconnected by means of a communication medium. The communication medium may be based e.g. on wires, RF technology or coded light. The interconnection between the devices enables a controlled lighting system, in which the information sensed by the sensors may control the luminaires and in particular determine the intensity settings of these luminaires.

Well known functionalities offered by these networked lighting systems are presence adaptation wherein luminaires are switched on only when people are present, and daylight adaptation wherein luminaires are dimmed when daylight enters a detection area. Illumination may thereby not need to be switched to full power to provide a user with a desired illumination level.

It is known to consider a network that includes M luminaires and N light sensors in a method for lighting control allowing for daylight adaptation in a networked lighting system. An N×M transfer matrix D is used to control the system. The entry $D_{sl}$ of the transfer matrix expresses the impact of luminaire l on sensor s, in that a light intensity $I_l$ of luminaire l results in a sensed intensity $D_{sl} I_l$ at sensor s.

The matrix D may be learned in an automatic way by successively switching on and off the luminaires in the system and measuring the impact on the sensors. This knowledge of D may for instance be used for daylight adaptation of the lighting system.

In such networked lighting systems, occasionally a luminaire or sensor will fail. Such failure reduces the performance of the lighting system. Provided that a failed device is identified, its failure may be compensated for by another device. Consequently, there is a need for a method of identifying such failed luminaire or sensor. Further, there is a need for a method able to identify that both a luminaire and a sensor have failed simultaneously.

SUMMARY OF THE INVENTION

In view of the above discussion, a concern of the present invention is to provide a method of detecting a failed luminaire and/or light sensor in a lighting system including a plurality of luminaires and a plurality of light sensors.

To address at least one of this concern and other concerns, a method of detecting a failed luminaire and/or light sensor in a lighting system and a failure resistant lighting system in accordance with the independent claims are provided. Preferred embodiments are defined by the dependent claims.

According to a first aspect of the invention, a method of detecting a failed luminaire and/or light sensor in a lighting system comprising M luminaires and N light sensors is provided, wherein the elements $D_{sl}$ of an N×M transfer matrix D expresses how each luminaire l affect a light sensor s with respect to sensed light intensity, wherein s=1, 2, . . . , N, and l=1, 2, . . . , M, and wherein each luminaire is controllable with respect to intensity of light emitted by the luminaire and each light sensor is adapted to sense intensity of light. The method comprises the steps of: setting the intensity of light emitted by the respective luminaires in the lighting system to a first intensity setting according to the respective elements of a first intensity vector $I^{(1)}$, determining a first sensor intensity vector $E^{(1)}$, each element of $E^{(1)}$ corresponding to the intensity of light measured by the respective light sensors when the luminaires emit light according to the first intensity setting, setting the intensity of light emitted by the respective luminaires to at least a second intensity setting according to the respective elements of a second intensity vector $I^{(2)}$, wherein at least one element of $I^{(2)}$ differs from a corresponding element or elements in $I^{(1)}$, determining a second sensor intensity vector $E^{(2)}$, each element of $E^{(2)}$ corresponding to the intensity of light measured by the respective light sensors when the luminaires emit light according to the second intensity setting, determining fault detection vectors from a difference between $E^{(1)}$ and $D \cdot I^{(1)}$, and between $E^{(2)}$ and $D \cdot I^{(2)}$, respectively, and identifying a failed luminaire and/or light sensor on basis of a difference between corresponding elements of the respective fault detection vectors.

The intensity of light emitted by the luminaires may first be set to an intensity setting according to the first intensity vector $I^{(1)}$, and thereafter according to a second intensity vector $I^{(2)}$. Corresponding sensor intensity vectors $E^{(1)}$, $E^{(2)}$ may be determined based on measured light intensity by the light sensors. In both sensor intensity vectors $E^{(1)}$, $E^{(2)}$, there may be a measured light intensity contribution due to external illumination. The external illumination may be the same in the two sensor intensity vectors, providing that an element in the second sensor intensity vector that differs too much from a predicted light intensity based on the transfer matrix D may correspond to a failed luminaire of light sensor. The elements of the fault detection vectors may relate to light intensities at the sensors due to external illumination.

The lighting system may be used indoors and/or outdoors. For indoors, the lighting system applies to propositions relating to so called intelligent offices. For outdoors, the lighting system may allow for efficient light on demand. For communication between the components of the lighting system, standards and technologies such as Coded Light, 6LoWPAN, CoAP, and/or ZigBee may be utilized.

The information of an identified failed device may be used to adapt the operation of the devices that have not failed in order to achieve a desired light output in spite of the failed device. A control unit may be used for controlling the luminaires. The control unit may control non-failed luminaires to so as to compensate for the failed luminaire with respect to achieving a desired light output from the lighting system.

In one embodiment, the determination of the second sensor intensity vector $E^{(2)}$ may be performed successive to the determination of the first sensor intensity vector $E^{(1)}$. By determining the second intensity vector successive to the determination of first intensity vector determination, preferably close in time after the first intensity vector determination, the external illumination measured by the light sensor may be kept relatively constant. This may provide an increased accuracy in identification of a failed device compared to when the temporal separation between determination the second intensity vector and determination of first intensity vector is relatively large.

In another embodiment, the second intensity setting may comprise an intensity change with respect to the first intensity setting for only one luminaire, and wherein the step of identifying a failed luminaire and/or light sensor may comprise comparing the elements of the determined sensor intensity vectors with the elements of the transfer matrix D.

The second intensity setting may comprise the same intensity as in the first intensity setting for M−1 luminaires. The measured intensities at the light sensors may then be determined and compared to the transfer matrix D to see if the light sensors detected the light intensity change as expected.

In a further embodiment, the step of identifying a failed luminaire and/or light sensor may comprise determining a fail vector F based on the determined sensor intensity vectors $E^{(1)}$, $E^{(2)}$, the light intensity vectors $I^{(1)}$, $I^{(2)}$ and the transfer matrix D, wherein the fail vector F may indicate if a failed luminaire and/or light sensor is present in the lighting system, wherein the fail vector F may be determined from a difference between a first fail vector $F^{(1)}$ and a second fail vector $F^{(2)}$, wherein $F^{(1)}=E^{(1)}-D \cdot I^{(1)}$, and $F^{(2)}=E^{(2)}D \cdot I^{(2)}$, wherein a non-zero fail vector F, e.g. a non-zero element in the fail vector F, may indicate the presence of a failed luminaire and/or light sensor in the lighting system.

Based on the predicted output from the light sensors in the transfer matrix D, a failed luminaire and/or light sensor may be determined in the fail vector. The two determined sensor intensity vectors $E^{(1)}$, $E^{(2)}$ may provide a basis for the determination of the fail vector F. If the light intensity measured by the light sensors, and determined in the sensor intensity vector $E^{(1)}$ is equal to the expected intensity according to the light intensity vector $I^{(1)}$ and the transfer matrix D, the first fail vector $F^{(1)}$ may be zero. If the case is the same for the second measurement, the second fail vector may also be zero, which may result in a zero fail vector F, indicating no failed devices. If any element in one of the first and second fail vectors is not as expected, a non-zero first and/or second fail vector may result, in turn resulting in a non-zero fail vector F.

In one embodiment, a threshold level for the fail vector F may be set, and values of elements in the fail vector above the threshold level may indicate the presence of a failed luminaire and/or light sensor in the lighting system.

The non-zero value of an element in the fail vector indicating a failed device, i.e. a failed luminaire or a failed light sensor, may thereby be changed to a threshold level. A threshold level may enable small deviations in the measured intensities to be accepted. Such small deviation may possibly not be caused by a failed device, but by changes, e.g. drifts, in the measurements.

In a further embodiment, the step of identifying a failed luminaire and/or light sensor may comprise identifying the largest element in the fail vector F.

The difference between an element in first sensor intensity vector $E^{(1)}$ and a corresponding element in second sensor intensity vector $E^{(2)}$ may provide a difference between the first fail vector $F^{(1)}$ and second fail vector $F^{(2)}$ for that element. The larger the difference is, the larger is the probability that the device corresponding to the element may have failed.

In another embodiment, if the fail vector F is non-zero, and on a condition that D is invertible, failed luminaires may be identified by non-zero elements in $d=D^{-1} \cdot F$.

For a non-failed luminaire, $e_j(I)=I_j$, wherein $e(I)$ may represent the intensity for failed luminaires in the intensity vector I. For a failed luminaire j, the intensity $e_j(I)$ may be a constant value (for a fixed output luminaire) or a random value following an error distribution (e.g. for a flickering luminaire). If there are no failed luminaires in the lighting system, $d=0$, which may provide $F=0$. Non-zero components of $D^{-1} \cdot F$ may identify a failed luminaire.

In yet another embodiment, a non-zero element $d_j$ of the vector d may represent a failed luminaire j.

The step of identifying a failed luminaire j may comprise defining vectors $x^j$ for all luminaires, wherein $x_j^j=I_j^{(2)}-I_j^{(1)}$, where $x_i^j=0$ for $i \neq j$, and a failed luminaire j* is identified by $j^*=\mathrm{argmin}_j \|F-D \cdot x^j\|^2$, where $\|\cdots\|$ denotes the norm of $F-D \cdot x^j$.

A vector $x^j$ may be defined for each luminaire in the system. For a specific luminaire j, the vector may be defined, wherein $x_j^j=I_j^{(2)}-I_j^{(1)}$. For a failed luminaire j, the non-zero component $d_j$ may be $d_j=e_j(I^{(1)})-I_j^{(1)}-(e_j(I^{(2)})-I_j^{(2)})$. $d_j$ may refer to the j:th component of the vector d. When there is a failed luminaire j, the component $d_j$ may be non-zero, resulting in the fail vector F to become non-zero.

In a further embodiment, the step of identifying a failed luminaire and/or light sensor may comprise a step of comparing two hypotheses, wherein a first hypothesis may be based on identifying a most likely to have failed light sensor s* as the largest element of the fail vector F, and defining a second fail vector $F^{s^*}$ representing the fail vector F with the element s* removed, and wherein a second hypothesis may be based on identifying a most likely to have failed luminaire j* by determining $j^*=\mathrm{argmin}_j \|F-D \cdot x^j\|^2$.

Based on the fail vector F, it may be determined whether a luminaire or a light sensor has failed. By determining two hypotheses as to a failed device, it may be determined a most likely to have failed luminaire or a most likely to have failed light sensor.

In yet a further embodiment, the error after the first hypothesis may be determined as $\|F^{s^*}\|^2$, and the error after the second hypothesis is determined as $\|F-D \cdot x^{j^*}\|^2$, where $\| \ldots \|$ denotes the norm of $F^{s^*}$ and $F-D \cdot x^{j^*}$, respectively, and wherein $x^{j^*}$ is determined from $x^j$ for j*.

The two hypotheses may be compared to identify which is the larger. An error value of a failed luminaire or light sensor in relation to a predicted value may be determined as the error after the first or second hypothesis respectively.

In another embodiment, the light sensor s* may be concluded to have failed if the error after the first hypothesis is smaller than the error after the second hypothesis, and wherein the luminaire j* may be concluded to have failed if the error after the first hypothesis is larger than the error after the second hypothesis.

A first determined failed device may be identified by comparing the two hypotheses. If the error after the first hypothesis is larger than the error after the second hypothesis, it may be determined that the luminaire j* is the most likely to explain why fail vector F is non-zero. The luminaire j* may thereby be identified as failed. If the error after the first hypothesis is smaller than the error after the second hypothesis, it may be determined that the light sensor s* is the most likely to explain why fail vector F is non-zero. The light sensor s* may thereby be identified as failed.

In one embodiment, the method may further comprise eliminating the failed sensor and/or luminaire from consideration in further detection of a failed luminaire and/or light sensor in the lighting system according to the steps of a method according to the present invention.

For example, the previously identified failed light sensor s* and/or the previously identified failed luminaire j* may be removed from further processing according to a method according to the present invention. When it was concluded that a sensor had failed, the method may be applied with N-1 sensors and M luminaires. When it was concluded that a luminaire had failed, the method may be applied with N sensors and M-1 luminaires.

In other words, to identify a further failed device, two new hypotheses may be determined, representing a failed light sensor and a failed luminaire, respectively. The new hypotheses may be compared to identify a second most likely to have failed sensor or luminaire. The new hypotheses may be compared to identify the additional largest element of fail vector F, best explaining why F is non-zero.

In another embodiment, the method may further comprise a step of sending information about an identified failed luminaire and/or light sensor to an external receiver.

The information about a failed luminaire and/or failed light sensor may be communicated to an external receiver. The external receiver may be a management service that may use the information to replace a failed device, or to inform a user of the lighting system that a service and/or maintenance of the system may be needed.

According to a second aspect of the invention, a failure resistant lighting system is provided, comprising M luminaires and N light sensors and a control unit, wherein each luminaire is controllable with respect to intensity of light emitted by the luminaire and each light sensor is adapted to sense intensity of light, and the control unit is adapted to control operation of the luminaires and light sensors, wherein the elements $D_{sl}$ of an N×M transfer matrix D expresses how each luminaire l affect a light sensor s with respect to sensed light intensity, wherein s=1, 2, ..., N, and l=1, 2, ..., M. The control unit is further adapted to set the intensity of light emitted by the respective luminaires in the lighting system to a first intensity setting according to the respective elements of a first intensity vector $I^{(1)}$, determine a first sensor intensity vector $E^{(1)}$, each element of $E^{(1)}$ corresponding to the intensity of light measured by the respective light sensors when the luminaires emit light according to the first intensity setting, set the intensity of light emitted by the respective luminaires to at least a second intensity setting according to the respective elements of a second intensity vector $I^{(2)}$, wherein at least one element of $I^{(2)}$ differs from a corresponding element or elements in $I^{(1)}$, determine a second sensor intensity vector $E^{(2)}$, each element of $E^{(2)}$ corresponding to the intensity of light measured by the respective light sensors when the luminaires emit light according to the second intensity setting, determine fault detection vectors from a difference between $E^{(1)}$ and $D \cdot I^{(1)}$, and between $E^{(2)}$ and $D \cdot I^{(2)}$, respectively, and identify a failed luminaire and/or light sensor on basis of a difference between corresponding elements of the respective fault detection vectors.

The control unit may be used to control the intensity of the luminaires and to determine the measured light by the light sensors. The control unit may use a method according to the present invention for identifying failed devices. The information about a failed device or devices may be used by the control unit to compensate for the lost functionality by controlling the non-failed devices in a desired way. For instance, if a luminaire has failed, the luminaires proximate to the failed luminaire may be controlled to compensate for the lost light emission and/or distribution of the failed luminaire. The elements of the fault detection vectors may relate to light intensities at the sensors due to external illumination.

In one embodiment, the lighting system may further comprise a communication unit adapted to communicate information about an identified failed luminaire or light sensor to an external receiver.

The information about a failed luminaire and/or failed light sensor may be communicated by the communication unit to an external receiver. The external receiver may be a management service that may use the information to replace a failed device, or to inform a user of the lighting system that a service of the system may be needed.

According to a third aspect of the invention, a computer program product is provided, adapted to, when executed in a processing unit, perform a method according to the present invention.

According to a fourth aspect of the invention, a computer-readable storage medium on which there is stored a computer program product is provided, wherein the computer program product is adapted to, when executed in a processing unit, perform a method according to the present invention.

It is noted that the invention relates to all possible combinations of features recited in the claims.

BRIEF-DESCRIPTION OF THE DRAWINGS

Various aspects of the invention, including its particular features and advantages, will be readily understood from the following detailed description and the accompanying drawings, in which.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided by way of example so that this disclosure will convey the scope of the invention to those skilled in the art. The steps of any method described herein do not have to be performed in the exact order as described, unless so is specifically stated Like reference characters refer to like elements throughout.

The present invention provides a method for the detection of failed devices, such as sensors and luminaires, in a lighting system. The method uses a transfer matrix D. The matrix D can be automatically learned by the lighting system. In a lighting system comprising a network of M luminaires and N light sensors the N×M transfer matrix D is used to control the system. The element $D_{sl}$, or D(s,l), of the transfer matrix D expresses the impact of luminaire l on sensor s, in that a light intensity $I_l$ of luminaire l results in a sensed intensity $D(s,l) \cdot I_l$ at sensor s. The matrix D can be learned in an automatic way by successively switching on and off the luminaires in the lighting system and measuring the impact on the sensors.

The method may utilize at least two intensity vectors $I^{(1)}$ and $I^{(2)}$. According to the embodiment of the present invention illustrated in FIG. 1, in a first step 102 of the method 100, the intensity of light emitted by the respective luminaire of the lighting system are set to a first intensity setting according to the respective elements of a first intensity vector $I^{(1)}$ and at a following step 104, a first sensor intensity vector $E^{(1)}$ is determined, wherein each element of the first sensor intensity vector $E^{(1)}$ corresponds to the intensity of light measured by the respective light sensors when the luminaires emit light according to the first intensity setting $I^{(1)}$ Next, and shortly thereafter, the intensity of light emitted by the respective luminaires of the lighting system are, in step 106, set to a second intensity setting according to the respective elements of a second intensity vector $I^{(2)}$, and at a following step 108, a second sensor intensity vector $E^{(2)}$ is determined, wherein each element of the second sensor intensity vector $E^{(2)}$ corresponds to the intensity of light measured by the respective light sensors when the luminaires emit light according to the second intensity setting $I^{(2)}$.

Figure 1:
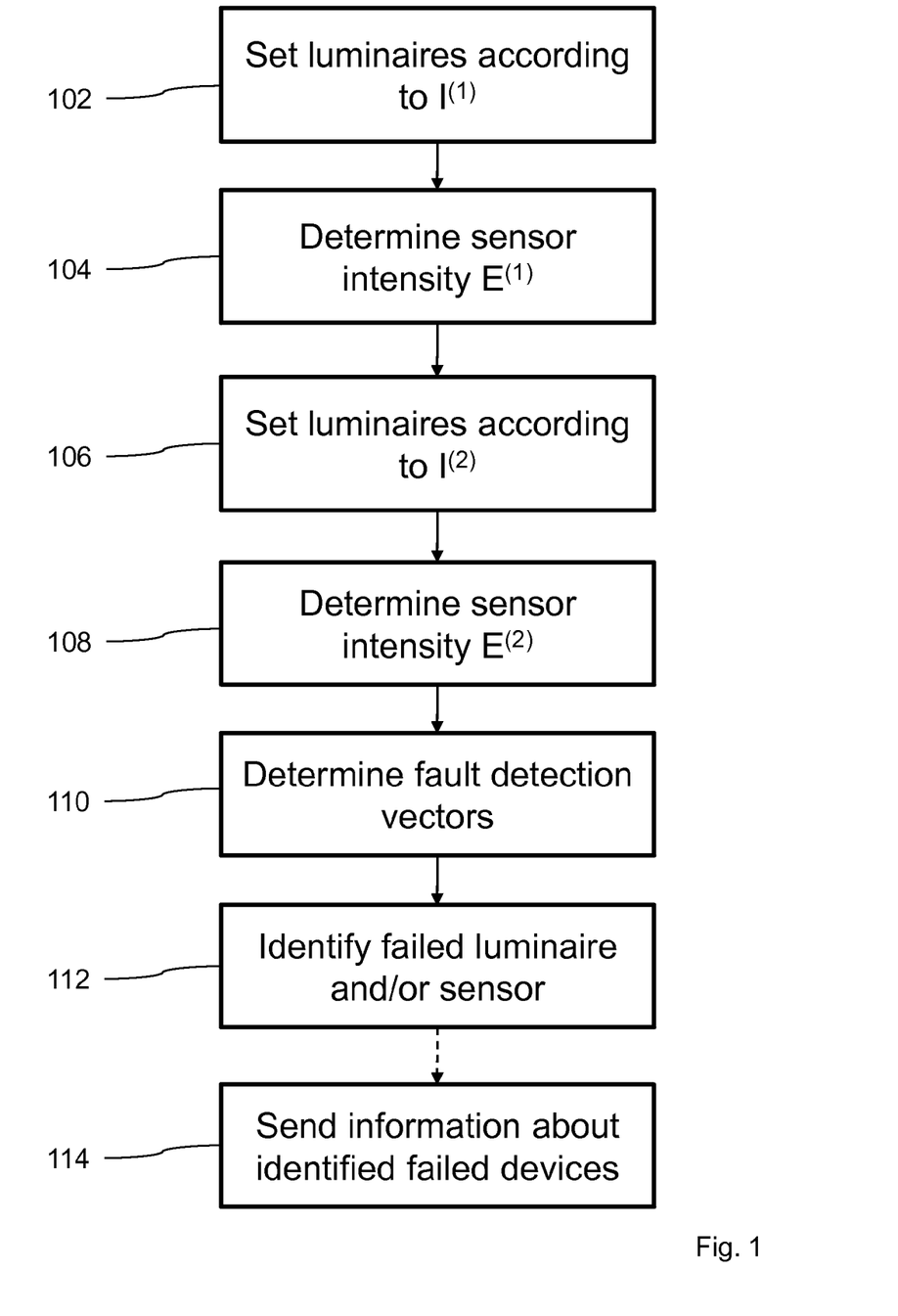
FIG. 1 is a flowchart of a method according to an embodiment of the present invention.

By comparing the measured intensity vectors $E^{(1)}$ and $E^{(2)}$ and benchmarking these against the predicted intensities calculated via the equation $E=D \cdot I+O$, it is possible, as we will detail below, to determine a combination of the luminaires and the sensors not responding well to the light intensity settings $I^{(1)}$, $I^{(2)}$ and to identify 110 the devices that have failed. In the present lighting system, $E=(E_1, E_2, \ldots, E_N)$, $I=(I_1, I_2, \ldots, I_M)$ and $O=(O_1, O_2, \ldots, O_N)$, wherein O is the vector of light intensities at the sensors due to external, outside, illumination.

In an optional step 114, the information about an identified failed device is sent to an external receiver. The information may be used for maintenance of the lighting system.

Figure 2:
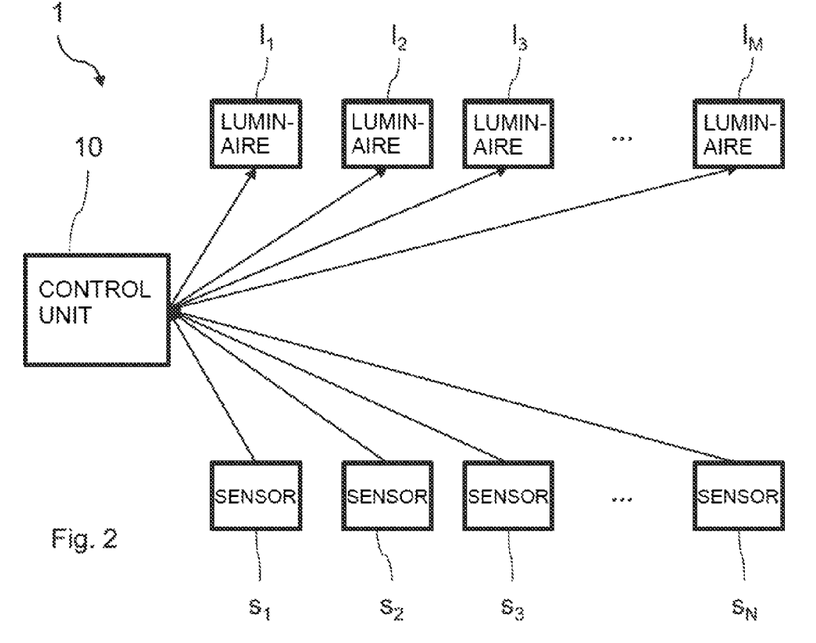
FIG. 2 is a block diagram of a lighting system according to an embodiment of the present invention.

FIG. 2 illustrates a networked lighting system 1 in which the control is running centrally in a control unit 10. The control unit 10 controls the intensity of the luminaires $l_1, l_2, \ldots l_m$ in the lighting system 1, and receives input from the light sensors $s_1, s_2, \ldots s_N$.

Figure 3:
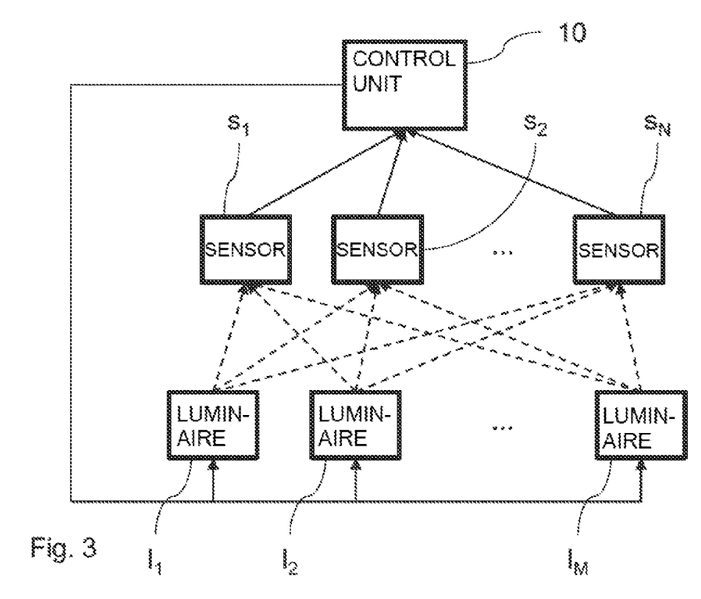
FIG. 3 is a block diagram of a lighting system according to an embodiment of the present invention.

FIG. 3 further illustrates how the control unit 10 controls the intensity of the luminaires and receives input from the sensors. Each of the luminaires $l_1, l_2, \ldots l_M$ in the lighting system 1 receives an intensity control signal from the control unit 10. Each luminaire $l_1, l_2, \ldots, l_m$ emits light that in different amount is measured by each of the sensors. Each sensor's measured light value is distributed to the control unit 10. The transfer matrix D expresses how much light from luminaire 1 is expected to be detected by sensor s. M is the number of luminaires $l_1, l_2, \ldots, l_M$, and N is the number of sensors $s_1, s_2, \ldots, s_N$, providing D to be a N=M transfer matrix.

$$D = \begin{pmatrix} l_1 \to s_1 & \ldots & l_M \to s_1 \\ \vdots & l_1 \to s_s & \vdots \\ l_1 \to s_N & \ldots & l_M \to s_N \end{pmatrix}$$

Principles of the present invention will be described in the following with reference to three different exemplifying embodiments relating to three scenarios, namely failure of a sensor only, failure of a luminaire or lamp only, and failure of both a sensor and a luminaire or lamp.

First, we consider the case in which only a faulty sensor is present. The control unit 10 may assume the perfect behavior of the luminaires $l_1, l_2, \ldots l_M$. The control unit 10 only has to observe whether the measurements provided by each of the sensors fit within an expected range. To this end, the control unit 10 can check whether:

the transfer function D of each sensor is similar to the other sensors in the system;

the transfer function D stays stable over time; and/or the sensor provides a message within the expected time window.

Since the control unit 10 knows the transfer function D and all the luminaires $l_1, l_2, \ldots l_M$ work in a reliable manner, the control unit 10 may check during operation whether a sensor behaves as it should behave by checking whether changes in the light intensity of a single luminaire 1 affect the sensor as expected according to the transfer function D According to an embodiment of the present invention, at least two intensity vectors $I^{(1)}$ and $I^{(2)}$ as presented above with reference to steps 102-108 are utilized. The lighting system then calculates $O^{(1)}=E^{(1)}-DI^{(1)}$ and $O^{(2)}=E^{(2)}-DI^{(2)}$. If the measurements are taken in sufficiently short period, the outside lighting conditions (measured by $O^{(1)}$ and $O^{(2)}$) will not have changed, or will have changed only slightly, so that $O^{(1)}$ and $O^{(2)}$ should be the same or very similar. Then the components of vectors $O^{(1)}$ and $O^{(2)}$ that differ too much correspond to a failed sensor.

It is not essential that the control unit 10 immediately concludes that devices have failed when some of the components of $|O^{(1)}-O^{(2)}|$ exceed some threshold. Alternatively, differences that exceed a threshold may drive the system to take additional measurements, before it concludes that a device has failed. Also, systematic (but small) changes (e.g. drifts) in successive measurements can be interpreted as device failures.

Alternatively, during an operational iteration, the control unit 10 keeps constant the light intensities of M−1 luminaires $l_1, l_2, \ldots l_M$ and changes the light intensity of one of them. The control unit 10 then observes whether the change observed by each of the sensors is as expected according to D.

It is further possible to define an additional failure detection phase in which the control unit 10 switches the luminaires $l_1, l_2, \ldots l_M$ on/off in a sequential way and observes whether the effect of the luminaires $l_1, l_2, \ldots l_M$ on the reliable sensors is as expected, using the known matrix D as benchmark.

In general, if any or a combination of the above detection variables is out of range, where out of range is computed, e.g., as the deviation from a given reference value, then the sensor is detected as faulty. Also, systematic changes in these measurements may be tracked to determine failed devices.

In a second embodiment, the case in which only faulty luminaires are present is considered. In this case, the measurements of the sensors are assumed to be correct. As will be detailed below, the control unit 10 may observe whether the behavior of the lamps is as expected.

According to an embodiment of the present invention, at least two intensity vectors $I^{(1)}$ and $I^{(2)}$ as presented above with reference to steps 102-108 are utilized. Because of the failed luminaires, however, the realized intensity vectors equal $e(I^{(1)})$ and $e(I^{(2)})$, where $e(I)=(e_1, \ldots e_M)$.

Obviously, for a non-failed luminaire j, $e_j(I)=$However, for a failed luminaire j, $e_j(I)=8$, where 8 may be a constant value for fixed output luminaires, or a random value following an error distribution for e.g. a flickering luminaire.

The lighting system then determines a fail vector F for the two intensity settings, $F^{(1)}$ and $F^{(2)}$.

$$F^{(1)}=E^{(1)}-DI^{(1)} \text{ and } F^{(2)}=E^{(2)}-D\,I^{(2)}.$$

Because, $E^{(i)}=D\cdot e(I^{(i)})+O^{(i)}$ for i=1, 2, and $O^{(1)}=O^{(2)}$, this results in $$\begin{aligned} F &= F^{(1)} - F^{(2)} \\ &= E^{(1)} - D \cdot I^{(1)} - (E^{(2)} - D \cdot I^{(2)}) \\ &= D \cdot e(I^{(1)}) + O^{(1)} - D \cdot I^{(1)} - (D \cdot e(I^{(2)}) + O^{(2)} - D \cdot I^{(2)}) \\ &= D \cdot (e(I^{(1)}) - I^{(1)} - (e(I^{(2)}) - I^{(2)})) \\ &= D \cdot d, \end{aligned} \quad (1)$$

where $$d = e(I^{(1)}) - I^{(1)} - (e(I^{(2)}) - I^{(2)}).$$

If there are no failed luminaires, $e(I^{(i)})=I^{(i)}$ for i=1,2, so that d=0, resulting in the fail vector F=0. If there is a failed luminaire, j, then $$d_j=\epsilon_j^{(1)}-I_j^{(1)}-(\epsilon_j^{(2)}-I_j^{(2)})$$

where $d_j$ refers to the j:th element of the vector d. For either failure model, it immediately follows that $d_j \neq 0$. Consequently, also the fail vector F will be non-zero. Hence, the fact that a luminaire has failed can be detected by a non-zero calculated value of F.

To detect which luminaires have failed, the following method is proposed. First, if D is invertible, $D^{-1}$ F is calculated, which approximates d. Hence, non-zero entries in $D^{-1}$ F identify non-zero elements in d, which in turn identify the failed luminaires.

As a second method, which may also be used if D is non-invertible, $d_j=I_j^{(2)}-I_j^{(1)}+\epsilon_j$, for the failed devices j is observed, where $\epsilon_j=0$ for the fixed output failure, and some zero mean stochastic quantity for the flickering failure mode, and $d_j=0$ otherwise. For j ranging over all luminaires, the control unit 10 constructs vectors $x^j$ such that $$x_j^j=I_j^{(2)}-I_j^{(1)} \quad (2)$$

and $x_l^j=0$, for $l \neq j$.
Then, luminaire j* is identified as $$j^*=\operatorname{argmin}_j \|F-Dx^j\|^2. \quad (3)$$

In a further iteration of the process, a second set of vectors $y^j$ is constructed such that an additional element (next to j*) is set to a non-zero value as follows $$y_{j^*}^j=I_{j^*}^{(2)}-I_{j^*}^{(1)}$$

$$y_j^j=I_j^{(2)}-I_j^{(1)}$$

and $y_l^j=0$, for $l \neq j$, and $l \neq j^*$.
Then, luminaire i* is identified as $$i^*=\operatorname{argmin}_j \|F-Dy^j\|^2.$$

This process is continued until no further improvement in fit with F is observed.

As a third method, it is also possible to estimate $x_j^j$, by calculating the value that best fits, rather than to initialize this element of the vector as in Eq. (2). It is not essential, though, that the control unit immediately concludes that luminaires selected by this procedure have failed. As other possibilities, differences that exceed a threshold can drive the system to take additional measurements, before it concludes that a device has failed. Also, systematic (but small) changes (e.g. drifts) in successive measurements can be interpreted as device failures.

Alternatively, an additional failure detection phase is defined in which the control unit 10 switches the luminaires on/off in a sequential way and observes whether the luminaires behave as expected and using the known matrix D as benchmark.

In a third embodiment, a case is considered in which both sensors and luminaires have failed. To deal with this case, methods such as described above for detecting failed luminaires and failed sensors, respectively, may be combined.

Thus, as before, the fail vector F is determined, as in Eq. (1). A non-zero fail vector F is an indication of a failed device. To identify the failed device, the most likely failed sensor is identified as the sensor corresponding to the largest component of fail vector F. This sensor is denoted by s* and the vector which equals F, but with the element s* removed is denoted by $F^{s^*}$. The luminaire j* that has most likely failed using the procedure in (3) is identified.

This results in two hypotheses as to a failed device. Next, the hypothesis that best explains why fail vector F is non-zero is identified. If $$\|F^{s^*}\|^2 < \|F-Dx^{j^*}\|^2 \quad (4)$$

it is concluded that sensor s* has failed. Otherwise, it is concluded that luminaire j* has failed.

In a next step, again two hypotheses are created. One hypothesis concerns the most likely-to-have-failed luminaire in addition to the device which has already been identified as having failed. The other hypothesis concerns the most likely-to-have-failed sensor in addition to the device which has already been identified as having failed. Again, the most likely to have failed candidate is identified by considering which hypothesis that best explains that fail vector F is non-zero.

It is not essential, as before, that the control unit 10 immediately concludes that identified devices have failed. As other possibilities, differences that exceed a threshold can drive the system to take additional measurements, before it concludes that a device has failed. Also, systematic (but small) changes (e.g. drifts) in successive measurements can be interpreted as device failures.

Figure 4:
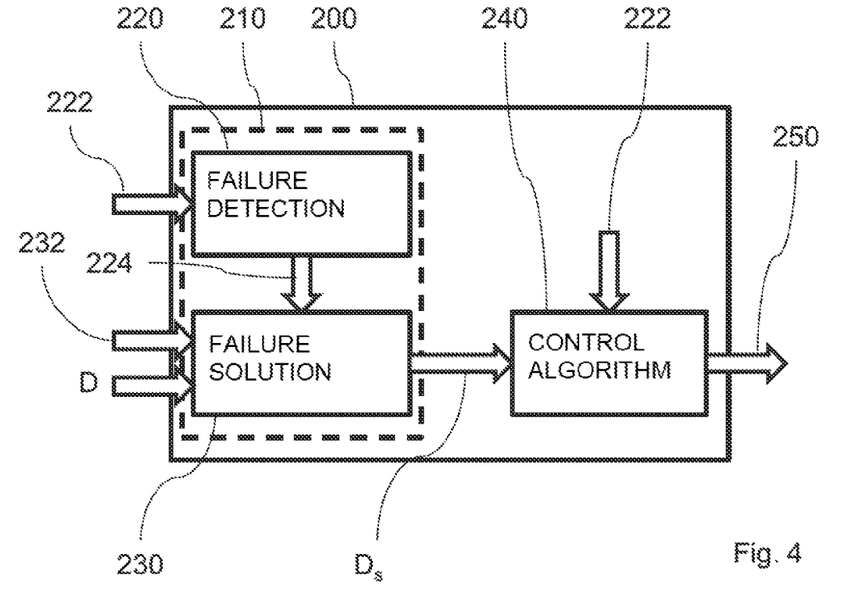
FIG. 4 is a block diagram of a lighting system according to an embodiment of the present invention.

FIG. 4 illustrates a failure resistant lighting system according to an embodiment of the present invention. The system relies on the functional diagram 200 depicted in FIG. 4 to deal with faulty devices. Two main blocks 210, 240 are provided: the control algorithm block 240 used to compute the light intensities and a block 210 in charge of identifying device failures. Block 210 comprises two sub-blocks, a first sub-block 220 for failure detection and a second sub-block 230 to solve the failure once it has been detected.

The first sub-block 220 receives sensor input 222 to identify a failed device according to a method such as described in the foregoing.

The second sub-block 230 receives as an input: the identification 224 of the failed device from the first sub-block 220, the type of the failed device, i.e. sensor or luminaire, 232 and the transfer matrix D. The type of failed device 232 determines which control method may be used by the sub-block 230. The second sub-block 230 then removes the rows pertaining to failed sensors and the columns that pertain to failed luminaires from the transfer matrix D. Next, the reduced matrix $D_s$ is communicated to the control algorithm in block 240, which then, based on D, and sensor inputs 222 controls 250 the lighting system.

Figure 5:
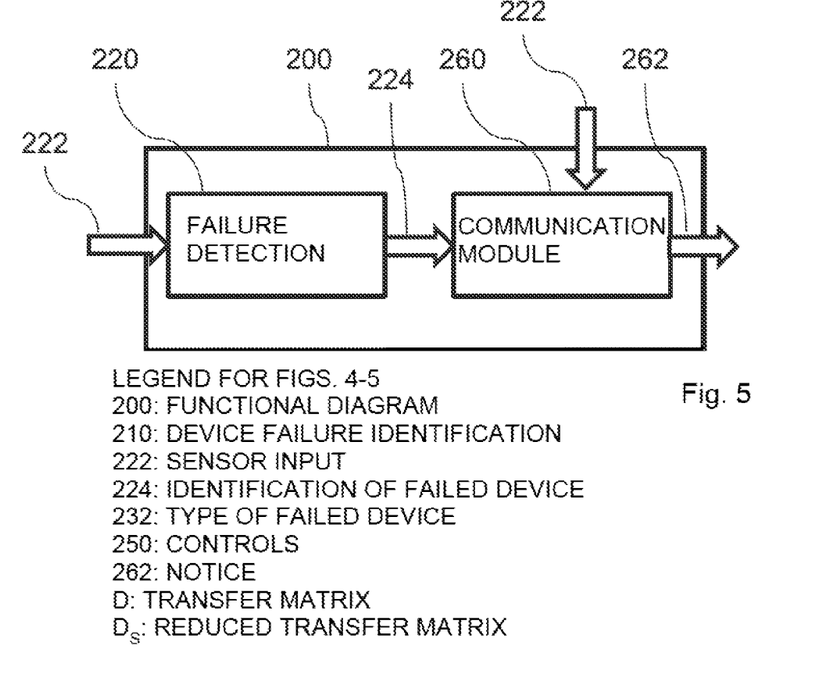
FIG. 5 is a block diagram of a lighting system according to an embodiment of the present invention.

As illustrated in FIG. 5, the present invention may be used in a failure notification application. In this case, the method in the first sub-block 220 is used to detect failed devices. The first sub-block 220 then passes the IDs 224 of devices that has failed to a communication module 260, e.g. connected to the Internet. This communication module 260 sends a notice 262 about the failed devices to a maintenance service. The sent information may then be used to repair the lighting system e.g. by replacing those devices that failed. Alternatively, the information may be used to notify the user of the lighting system that device failures are imminent, so that the user can request a maintenance company to service the failed devices.

Further, as illustrated in FIG. 5, the present invention may be used in a device monitoring application. In this case, the measurements of sensor intensity vectors $E^{(1)}$ and $E^{(2)}$ are received as input 222 by the communication module 260 and transmitted periodically to the maintenance service. The sensor intensity vectors may correspond to two preset intensity vectors $I^{(1)}$ and $I^{(2)}$. Alternatively, the intensity vectors are defined dependent on the local situation and included in the transmission 262 to the maintenance service. At each commissioning instant, the lighting system also transmits the system matrix D to the maintenance service. The maintenance company may then analyze this information to decide on or advice on service and maintenance actions.

The embodiments illustrated in FIGS. 4 and 5 may be combined in the same application such that the IDs 224 of failed devices are both communicated to the second sub-block 230 to determine the reduced transfer matrix D and communicated to a communication module 260 for transfer 262 to a maintenance service.

The person skilled in the art realizes that the present invention by no means is limited to the preferred embodiments described above. On the contrary, many modifications and variations are possible within the scope of the appended claims. For example, the method may comprise additional analyzing and determining steps, the lighting system may comprise additional blocks and functions.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

The invention claimed is:

1. A method of detecting a failed luminaire and/or light sensor in a lighting system comprising M luminaires and N light sensors, wherein the elements $D_{sl}$ of an N×M transfer matrix D expresses how each luminaire l affect a light sensor s with respect to sensed light intensity, wherein s=1, 2, . . . , N, and l=1, 2, . . . , M, and wherein each luminaire is controllable with respect to intensity of light emitted by the luminaire and each light sensor is adapted to sense intensity of light, the method comprising the steps of:

setting the intensity of light emitted by the respective luminaires in the lighting system to a first intensity setting according to the respective elements of a first intensity vector $I^{(1)}$, determining a first sensor intensity vector $E^{(1)}$, each element of $E^{(1)}$ corresponding to the intensity of light measured by the respective light sensors when the luminaires emit light according to the first intensity setting, setting the intensity of light emitted by the respective luminaires to at least a second intensity setting according to the respective elements of a second intensity vector $I^{(2)}$, wherein at least one element of $I^{(2)}$ differs from a corresponding element or elements in $I^{(1)}$, determining a second sensor intensity vector $E^{(2)}$, each element of $E^{(2)}$ corresponding to the intensity of light measured by the respective light sensors when the luminaires emit light according to the second intensity setting, determining fault detection vectors from a difference between E(1) and D·$I^{(1)}$, and between E(2) and D·$I^{(2)}$, respectively, and identifying a failed luminaire and/or light sensor on basis of a difference between corresponding elements of the respective fault detection vectors.

2. A method according to claim 1, wherein the determination of the second sensor intensity vector $E^{(2)}$ is performed successive to the determination of the first sensor intensity vector $E^{(1)}$.

3. A method according to claim 1, wherein the step of identifying a failed luminaire and/or light sensor comprises determining a fail vector F based on the determined sensor intensity vectors $E^{(1)}$, $E^{(2)}$, the light intensity vectors $I^{(1)}$, $I^{(2)}$ and the transfer matrix D, wherein the fail vector F indicates if a failed luminaire and/or light sensor is present in the lighting system, wherein the fail vector F is determined from a difference between a first fail vector $F^{(1)}$ and a second fail vector $F^{(2)}$, wherein $$F(1)=E(1)-D\cdot I^{(1)}, \text{ and}$$

$$F(2)=E(2)-D\cdot I^{(2)},$$

wherein a non-zero fail vector F indicates the presence of a failed luminaire and/or light sensor in the lighting system.

4. A method according to claim 3, wherein a threshold level for the fail vector F is set, and wherein values of elements in the fail vector above said threshold indicates the presence of a failed luminaire and/or light sensor in the lighting system.

5. A method according to claim 3, wherein the step of identifying a failed luminaire and/or light sensor comprises identifying the largest element in the fail vector F.

6. A method according to claim 5, wherein if the fail vector F is non-zero, and on a condition that D is invertible, failed luminaires are identified by non-zero elements in $$d=D-1\cdot F.$$

7. A method according to claim 5, wherein the step of identifying a failed luminaire comprises defining vectors $x^j$ for all luminaires, wherein $x_j^j = I_j^{(2)} - I_j^{(1)}$, where $x_i^j = 0$ for $i \neq j$, and a failed luminaire j* is identified by $j^*=\text{argmin}_j \|F-D\cdot x^j\|^2$, where $\|\cdots\|$ denotes the norm of $F-D\cdot x^j$.

8. A method according to claim 7, wherein the step of identifying a failed luminaire and/or light sensor comprises a step of comparing two hypotheses, wherein a first hypothesis is based on identifying a most likely to have failed light sensor s* as the largest element of the fail vector F, and defining a second fail vector $F^{s^*}$ representing the fail vector F with the element s* removed, and wherein a second hypothesis is based on identifying a most likely to have failed luminaire j* by determining $j^*=\text{argmin}_j \|F-D\cdot x^j\|^2$.

9. A method according to claim 8, wherein the error after the first hypothesis is determined as $\|F^{s^*}\|^2$, and the error after the second hypothesis is determined as $\|F-D\cdot x^{j^*}\|^2$, where $\|\cdots\|$ denotes the norm of $F^{s^*}$ and $F-D\cdot x^{j^*}$, respectively, and wherein $x^{j^*}$ is determined from $x^j$ for j*.

10. A method according to claim 8, wherein the light sensor s* is concluded to have failed if the error after the first hypothesis is smaller than the error after the second hypothesis, and wherein the luminaire j* is concluded to have failed if the error after the first hypothesis is larger than the error after the second hypothesis.

11. A method according to claim 10, further comprising eliminating the failed sensor and/or luminaire from consideration in further detection of a failed luminaire and/or light sensor in the lighting system according to the steps of a method.

12. A method according to claim 11, further comprising a step of sending information about an identified failed luminaire and/or light sensor to an external receiver.

13. A failure resistant lighting system comprising M luminaires (l) and N light sensors (s) and a control unit, wherein each luminaire is controllable with respect to intensity of light emitted by the luminaire and each light sensor is adapted to sense intensity of light, and the control unit is adapted to control operation of the luminaires and light sensors, wherein the elements $D_{sl}$ of an N×M transfer matrix D expresses how each luminaire l affect a light sensor s with respect to sensed light intensity, wherein s=1, 2, ..., N, and l=1, 2, ..., M, and wherein the control unit further is adapted to:
- set the intensity of light emitted by the respective luminaires in the lighting system to a first intensity setting according to the respective elements of a first intensity vector I(1) I(1),
- determine a first sensor intensity vector $E^{(1)}$, each element of $E^{(1)}$ corresponding to the intensity of light measured by the respective light sensors when the luminaires emit light according to the first intensity setting,
- set the intensity of light emitted by the respective luminaires to at least a second intensity setting according to the respective elements of a second intensity vector $I^{(2)}$, wherein at least one element of $I^{(2)}$ differs from a corresponding element or elements in $I^{(1)}$,
- determine a second sensor intensity vector $E^{(2)}$, each element of $E^{(2)}$ corresponding to the intensity of light measured by the respective light sensors when the luminaires emit light according to the second intensity setting,
- determine fault detection vectors from a difference between
- E(1) and $D \cdot I^{(1)}$, and between
- E(2) and $D \cdot I^{(2)}$, respectively, and
- identify a failed luminaire and/or light sensor on basis of a difference between corresponding elements of the respective fault detection vectors.

14. A failure resistant lighting system according to claim 13, further comprising a communication unit adapted to communicate information about an identified failed luminaire or light sensor to an external receiver.

15. A non-transitory computer program product adapted to, when executed in a processing unit, perform a method according to claim 12.

16. A non-transitory computer-readable storage medium on which there is stored a computer program product adapted to, when executed in a processing unit, perform a method according to claim 12.

* * * * *